United States Patent [19]

Boyce et al.

[11] Patent Number: 4,796,258
[45] Date of Patent: Jan. 3, 1989

[54] MICROPROCESSOR SYSTEM DEBUG TOOL

[75] Inventors: Douglas G. Boyce; Sam M. Deleganes, both of Aloha; Robert M. Nathanson, Tigard; Timothy E. Bieber, Beaverton, all of Oreg.

[73] Assignee: Tektronix, Inc., Beaverton, Oreg.

[21] Appl. No.: 877,625

[22] Filed: Jun. 23, 1986

[51] Int. Cl.⁴ .......................................... G06F 11/00
[52] U.S. Cl. ..................................... 371/16; 364/900
[58] Field of Search ... 364/200 MS File, 900 MS File; 371/16

[56] References Cited

U.S. PATENT DOCUMENTS

| | | | |
|---|---|---|---|
| 4,231,087 | 10/1980 | Hunsberger et al. | 364/200 |
| 4,312,066 | 1/1982 | Bantz et al. | 371/16 |
| 4,315,321 | 2/1982 | Parks, III et al. | 364/900 |
| 4,554,630 | 11/1985 | Sargent et al. | 364/200 |
| 4,569,048 | 2/1986 | Sargent | 371/16 |
| 4,622,647 | 11/1986 | Sagnard et al. | 371/20 |
| 4,638,423 | 1/1987 | Ballard | 364/200 |
| 4,661,921 | 4/1987 | Barnes | 364/708 |
| 4,674,089 | 6/1987 | Poret et al. | 364/200 |
| 4,691,316 | 9/1987 | Phillips | 371/20 |
| 4,703,482 | 10/1987 | Auger et al. | 371/20 |

FOREIGN PATENT DOCUMENTS

57-141761A 9/1982 Japan .

OTHER PUBLICATIONS

ML4100 Logic Analyzer Operating Manual, Section VIII, ROM Emulator Module (RE-016), Sep. 6, 1984, ARIUM.

*Primary Examiner*—Gareth D. Shaw
*Assistant Examiner*—Rebecca L. Adams
*Attorney, Agent, or Firm*—Francis I. Gray; Boulden G. Griffith

[57] ABSTRACT

A microprocessor system debug tool has a mainframe which interfaces with a user. A ROM emulator replaces a ROM unit of the microprocessor system to be tested and has a monitor portion which is used to perform debug functions specified by the user. A user defined control line is connected to the interrupt system of the microprocessor system to cause the target microprocessor to stop execution of the user's program and jump to the monitor portion upon the occurrence of a user defined event to execute microprocessor specific debug code generated by the mainframe in response to the user's input. At the conclusion of debug code execution the microprocessor resumes the user's program. A word recognizer is connected to the microprocessor bus to detect the results of the debug code execution, the results being forwarded to the mainframe for display to the user.

8 Claims, 2 Drawing Sheets

MICROPROCESSOR SYSTEM DEBUG TOOL

BACKGROUND OF THE INVENTION

The present invention relates to digital design tools, and more particularly to a microprocessor system debug tool which controls a target microprocessor through its read only memory (ROM).

To analyze a microprocessor system a logic analyzer is connected to the microprocessor bus. All input and output from the microprocessor may be decoded by the logic analyzer so that the user has a listing of the program being executed. This is a passive system.

Alternatively an emulator may be used to replace the microprocessor in developing software for the microprocessor. The emulator performs all the functions of the microprocessor to exercise the system, and the resulting software may then be ported into the microprocessor with the expectation that the system will function in the same manner. However, as the microprocessors get more and more complicated it is geometrically more and more difficult and expensive to develop an emulator for each type of microprocessor since the emulator is unique to the particular type of microprocessor it is emulating.

Another form of emulator is a ROM emulator where, rather than replacing the microprocessor with an emulator, a system ROM is replaced by the emulator. The ROM emulator interacts with the system by providing a mechanism by which the user data supplied by a ROM may be modified without requiring the user to physically reprogram and replace the ROM. It has no capabilities for stopping the microprocessor, or for providing the user with read/write operations with the system memories and registers.

What is desired is a microprocessor debug tool which combines the features of the logic analyzer in decoding information from the microprocessor bus with the emulsion functions of stopping the microprocessor and performing read/write operations plus the flexibility of being readily adaptable for any type of microprocessor.

SUMMARY OF THE INVENTION

Accordingly, the present invention provides a microprocessor system debug tool which acts as a ROM emulator while maintaining the ability of monitoring the operation of the system. The debug tool communicates with a mainframe instrument via a communication module. Instructions entered by a user in the mainframe are translated into microprocessor specific code and transferred to a ROM emulator which is plugged into the system. An unused portion of the ROM is set aside by the user as an area to contain a monitor for use by the debug tool. A user defined control line is connected to the system's interrupt circuits which, when activated, causes the microprocessor to jump to the monitor to execute a command fragment requested by the user. A dedicated word recognizer monitors the microprocessor bus and reports back to the mainframe via the communication module the result of the command fragment execution. Thus the microprocessor system is exercised by the ROM emulator and monitored by the word recognizer. Since only the command fragments are microprocessor specific, only relatively minor software modifications need to be made to adapt to other microprocessor types.

The objects, advantages and other novel features of the present invention will be apparent from the following detailed description when read in conjunction with the appended claims and attached drawing.

DESCRIPTION OF THE PREFERRED EMBODIMENT

Figure 1:
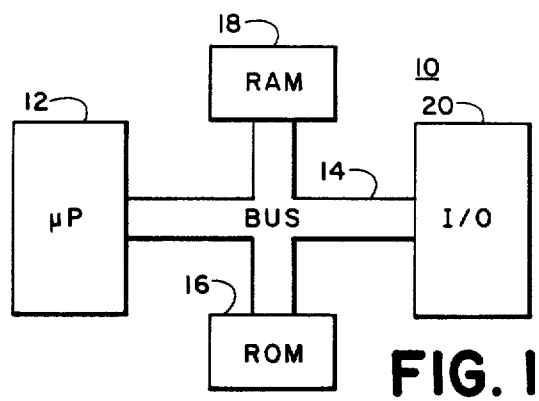
FIG. 1 is a block diagram view of a typical microprocessor system.

Referring now to FIG. 1 a typical microprocessor system 10 has a microprocessor 12 which interconnects with other devices via a microprocessor bus 14. The microprocessor bus 14 includes address, data and control functions which may be in the form of a single bus with either a single word including all functions or the functions being multiplexed, or in the form of separate buses for each function. A ROM 16 attached to the microprocessor bus 14 generally contains nonvolatile instructions and data which the microprocessor uses in executing programs. Also a volatile random access memory (RAM) 18 is attached to the microprocessor bus 14 and contains volatile application programs and data as well as serving as a scratchpad. Finally suitable input/output (I/O) devices 20 are attached to the microprocessor bus 14 to provide communication with the surrounding environment.

Figure 2:
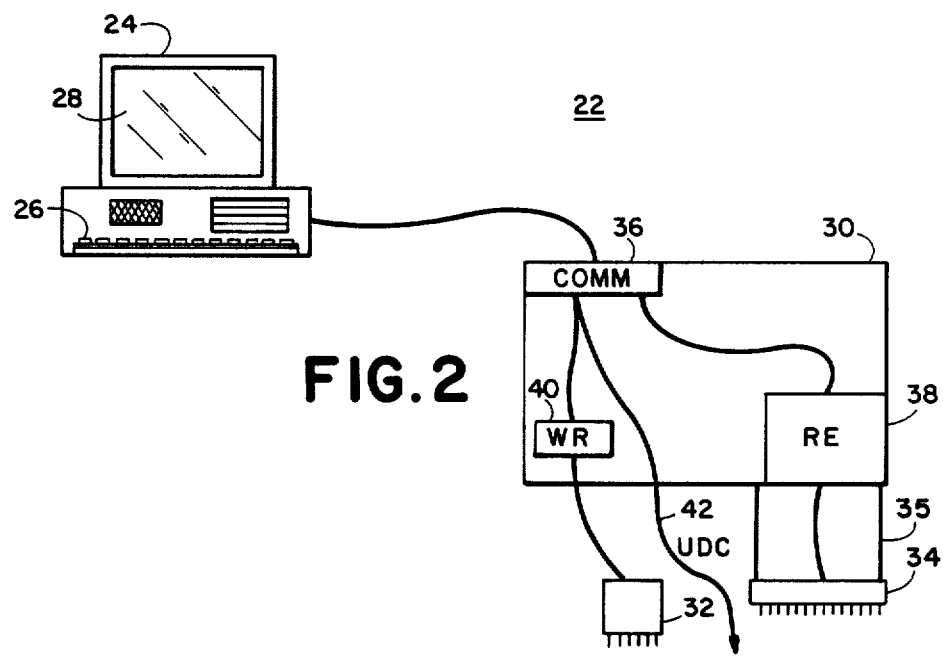
FIG. 2 is a block diagram view of a microprocessor debug tool according to the present invention.

As shown in FIG. 2 a debug tool 22 has a mainframe instrument 24 with an input device 26, such as a computer keyboard, and an output device 28, such as a CRT display, for user interface. A state/timing module (STM) 30 is connected to the mainframe 24 and has a processor probe 32 which is connected to the microprocessor bus 14 and receives a debug probe 35 having a ROM connector 34 which is connected to the microprocessor bus via a ROM socket in lieu of the ROM 16. The STM 30 has a communications buffer 36 through which all information transfers between the mainframe and the STM 30 are processed. The ROM connector 34 is connected to a ROM emulator 38 which is also on the debug probe 35 and which receives from the mainframe 24 via the communications buffer 36 command fragments specified by the user to be executed by the microprocessor 12. The processor probe 32 is connected to a dedicated word recognizer 40 which detects the result of the execution of the command fragments and forwards it to the mainframe 24 via the communications buffer 36. A third element, a user defined control (UDC) line 42, is connected to the interrupt system of the microprocessor 12 to alert the microprocessor when it is to stop its execution and execute the command fragments. The interrupt generated by the UDC may be either a manual interrupt by the user or an automatically triggered interrupt set up by the user upon the occurrence of certain events. The UDC may be connected to a non-maskable interrupt (NMI) of the microprocessor 12, or to a maskable interrupt. Control might also be transferred to the command fragment via execution of a branch and/or a trap instruction (SWI). Such instructions may be placed in the microprocessor program manually by the user or automatically through use of the debug tool.

Figure 3:
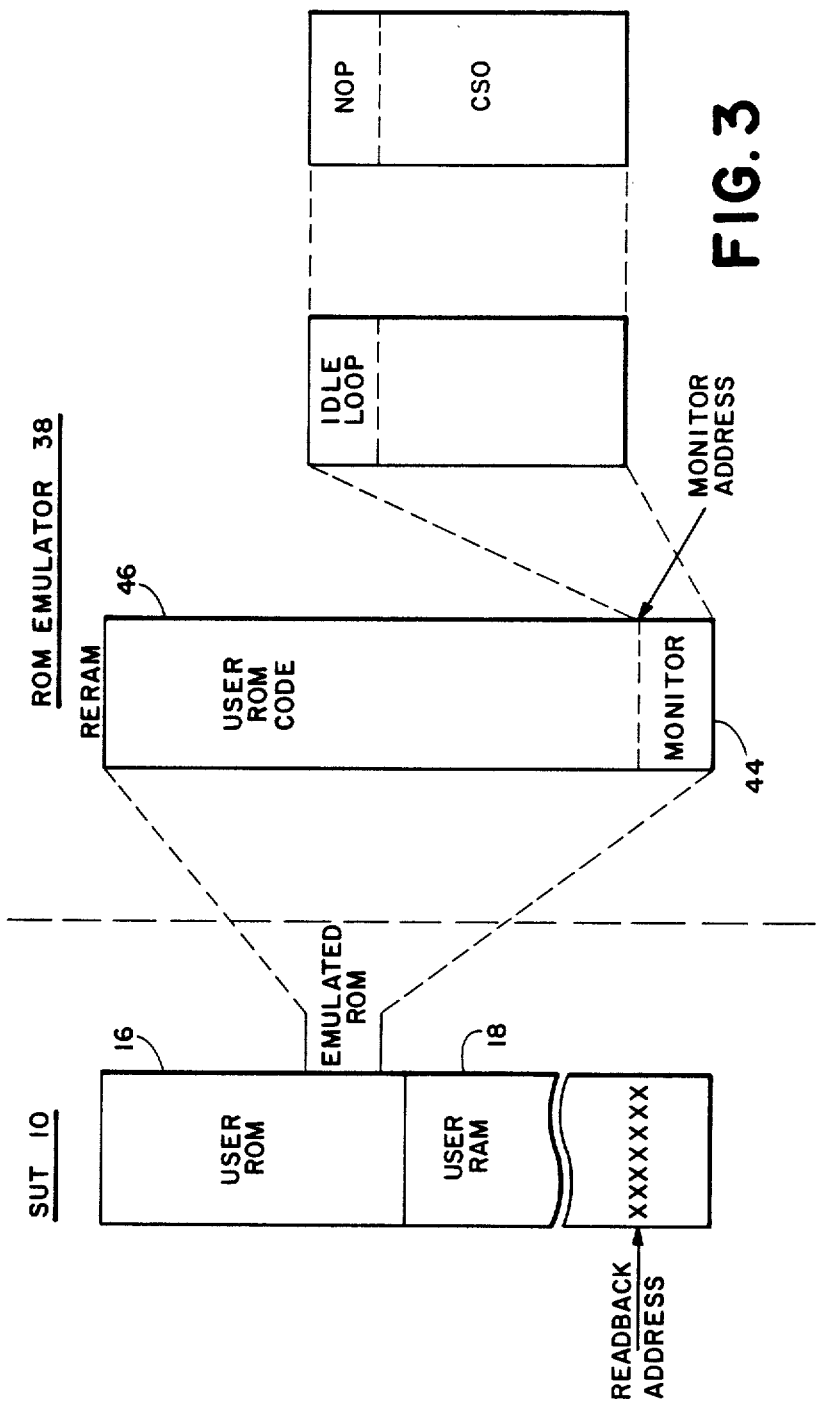
FIG. 3 is a memory map view of the ROM emulator used in the microprocessor debug tool.

The ROM emulator 38 is a RAM (RERAM) having a memory map as shown in FIG. 3. To provide the flexibility to accommodate microprocessors having eight, sixteen or thirty-two bit buses, the ROM emulator is in fact made up of a plurality of eight bit RAMs. For a sixteen bit bus two RAMs are used, each having the same addresses and size. Likewise for a thirty-two bit bus four RAMs are connected in parallel, each having the same addresses and size. The result to the user is an emulated ROM which may be used with any bus width without having specialized hardware for each microprocessor type. The user specifies a monitor portion 44 of the memory which will be used by the debug tool 22. The remainder 46 of the memory contains the user's code. The monitor portion 44 has an idle loop having a non operational (NOP) command and a branch command such as <X: Branch to X>. A command segment overlay is created by the mainframe 24 in response to the user's requested functions which contains the monitor code, i.e., the microprocessor specific command fragments to be executed by the target microprocessor 12. During the fetch cycle for the NOP command the command segment overlay is loaded into the monitor memory 44, replacing the idle loop with the command fragments. Likewise during the NOP command after execution of all command fragments the idle loop is reloaded to return to the initial condition.

In operation the microprocessor system 10 operates in a normal fashion except that the monitor portion 44 of the ROM emulator 38 is not available to the microprocessor 12. Upon either a manual activation by the user or an automatic activation according to the user's set up, the UDC 42 or SWI transmits an interrupt to the microprocessor 12. When the microprocessor 12 acts upon the interrupt, the microprocessor stops its current execution and jumps to the first address of the monitor memory 44 which contains the NOP code, placing the microprocessor 12 in the idle loop. A flag is set to alert the mainframe 24 that the microprocessor is now executing within the monitor memory 44 and the UDC 42 is disabled. Then the user, via the mainframe input device 26, asks the microprocessor 12 to execute a specific function, such as read/write to memory or registers, set/clear breakpoints or branch to user's code at {address}. The mainframe 24 translates the user specific function into the appropriate microprocessor specific code for execution by the type of microprocessor 12 being targeted, and the resulting command fragments are input via the command segment overlay into the monitor memory 44. The microprocessor 12 exits the idle loop and executes the command fragments. The results of the execution of the command fragments are stored in a user specified space in RAM 18 which is monitored by the word recognizer 40. The result is then returned to the mainframe 24 via the communications buffer 36 where it is displayed on the display device 28. Additional command fragments may be specified by the user and executed by the microprocessor 12 in the same manner. At the conclusion of the final command fragment the microprocessor 12 is instructed to jump back to the point in the program where it was interrupted to resume regular program execution.

Thus, the present invention provides a microprocessor debug tool which has a ROM emulator with the user's resident code and a protected monitor memory portion for command fragments specified by the user to be executed by the microprocessor upon receipt of a software interrupt or an interrupt over a user defined control line, either manual or automatic upon detection of a user specified event. The result of the command fragment execution is detected by a word recognizer to complete the communication loop with the user. The only portion of the debug tool which is microprocessor specific is that portion of the code resident in the mainframe which translates specific user requested functions into the command fragments.

What is claimed is:

1. A microprocessor system debug tool comprising:
    a mainframe having means for interfacing with a user and means for translating user specified commands into microprocessor specific command fragments;
    a ROM emulator, which physically and logically replaces a ROM unit of a microprocessor system being tested, having a portion reserved by the user as a monitor memory;
    a user defined control line connected to an interrupt system of the microprocessor system by which a user specified command causes a target microprocessor of the microprocessor system to transfer execution to the monitor memory to execute the microprocessor specific command fragments generated by the mainframe in response to user inputs via the interfacing means; and
    means for monitoring the results of the execution of the command fragments by the microprocessor connected to the bus of the microprocessor.

2. A debug tool as recited in claim 1 wherein the monitoring means comprises:
    a processor probe connected to a bus of the target microprocessor;
    a word recognizer connected to the processor probe such that, when the result of the execution of the command fragment is written into a user specified location of memory for the target microprocessor, the data in the user specified location is extracted; and
    means for transferring the extracted data to the mainframe for display via the interfacing means.

3. A debug tool as recited in claim 1 wherein the ROM emulator comprises a ROM emulation RAM having a plurality of individual RAMS which are configured by the user to match the size of the ROM unit to be emulated in bus width and number of addresses.

4. A microprocessor system debug tool, for a microprocessor system having a target microprocessor, a bus, and a memory containing executable code, the debug tool comprising:
    a mainframe having a user interface and means for translating user instructions into microprocessor specific command fragments;
    a memory emulator having a normal contents portion and a monitor portion; means for connecting the memory emulator to the bus so as to physically and logically replace the memory; and
    means for monitoring the bus so that microprocessor activities on the bus responsive to the execution of the code in the memory emulator may be monitored for display at the user interface and so that user defined conditions may be detected.

5. A debug tool as recited in claim 4, further comprising:
    a user defined control line for transmitting interrupt signals from the mainframe and from the monitoring means to an interrupt circuit of the target microprocessor; and
    means for generating signals on the user defined control line when the monitoring means detects the occurrence of user defined conditions on the bus.

6. A debug tool as recited in claim 5 wherein the monitoring means comprises a word recognizer having a plurality of inputs and an output with the inputs connected to the bus and the output connected to the mainframe and the user defined control line.

7. A method for controlling a microprocessor system using a memory emulator having a normal contents portion, a monitor portion, and a substitute connection means, with the microprocessor system having a target microprocessor, interrupt circuitry, a bus, and a memory containing executable code, the method comprising the steps of:

replacing the memory with the substitute connection means, designating an unused portion of memory address space as the monitor portion of the memory emulator to which control is to be transferred upon the occurrence of an interrupt or a breakpoint or upon the execution of code transferring control to the monitor portion, operating the microprocessor system using executable code in the normal contents portion of the memory emulator, commanding changes in the operation of the microprocessor system by placing user controlled and mainframe generated microprocessor specific command fragments in the monitor portion of the memory emulator, transferring control from the normal contents portion of the memory emulator to the monitor portion of the memory emulator by activating the interrupt circuitry or by putting a breakpoint or the address of the monitor portion of the memory emulator in the normal contents portion, executing the microprocessor specific command fragments in the monitor portion of the memory emulator, and returning control to the normal contents portion of the memory emulator.

8. A method as recited in claim 7 further comprising the step of monitoring the bus for user defined conditions and activating the interrupt circuitry so as to cause the step of transferring control to occur upon the occurrence of the user defined conditions.

* * * * *